Feb. 18, 1969     S. HIGGINS     3,428,727

METHOD FOR PRODUCING AN IMPROVED MATRIX MOLDING BOARD

Filed March 25, 1963

INVENTOR.
SIGFRIED HIGGINS
BY
Angelo M. Pisarra
ATTORNEY 3,428,727
METHOD FOR PRODUCING AN IMPROVED MATRIX MOLDING BOARD
Sigfried Higgins, Montclair, N.J., assignor to Williamson & Company, Caldwell, N.J., a corporation of New Jersey
Filed Mar. 25, 1963, Ser. No. 267,540
U.S. Cl. 264—293　　　　　　　　　　　　　　　1 Claim
Int. Cl. B28b *11/10*

This invention relates to improved matrix molding boards and to methods for making and using them. Said boards are capable of being embossed by the use of heat and pressure to provide matrices for printing plates and similar articles of manufacture. Said novel matrices are not only suitable for the production of rubbery printing plates but are also useful for the production of rigid printing plants therefrom.

Matrix molding boards have been employed in the printing industry for more than 20 years. Examples of such matrix molding boards are described in the U.S. Patent 2,278,291 of Mar. 31, 1942, which issued to me and Hylton Swan. In general matrix molding boards consist of a fiber and resin sheet base carrying a coating comprising a resinous molding or moldable composition. Various types of thermosetting resin containing sheet bases have been employed in this art and have differed from each other in certain respects, all being well known to the art. Among them are those produced by laminating a plurality of layers of thin sheets of fibrous material with a thermosetting resin and those produced by providing a thermosetting resin-pulp composition in a beater and then building up said composition on a paper machine of the wet type to the desired thickness and then dried and cut into sheets of the desired size. Subsequently a face of the sheet is coated by spraying a layer consisting of a filler and thermosetting resin in a liquid carrier onto said face. The coating is dried at a temperature sufficient to volatilize the liquid carrier but insufficient to advance or harden to any substantial degree the resin thereon and/or the resin component of said base. The coating thus produced has a rough matte surface. And, such matrix molding boards whose coatings are characterized by being of rough matte finish have been produced and sold in large quantities.

While such matrix molding boards have found acceptance and have been suitable for the production of matrices therefrom from which rubber and other elastomeric printing plates may be produced, they have been found unsuitable for the making of large numbers of rigid plastic printing plates therefrom. Their unsuitability is evidenced by the "picking off" of the surface of the matrix in the course of producing the rigid plastic printing plates therefrom thereby rendering the matrix commercially useless for further use.

After considerable experimentation, I discovered that unique matrix molding boards may be produced by employing certain methods hereinafter described. Each of the novel matrix molding boards of this invention has the following unique combination of characteristics:

(1) The outer or working surface of the matrix molding board is a substantially flat surface which is uniformly shiny, smooth and glossy in appearance throughout the entire area thereof and free of pinholes and/or gas marks;

(2) The back face thereof is characterized by having a plurality of more easily compressible shallow projections; the projections are preferably in the form of shallow knobs;

(3) The matrix molding board is capable of being embossed under heat and pressure with an electrotype, photoengraving, stereotype, typematter or combinations thereof to provide a suitable matrix for the production of plastic printing plates, without danger of blistering, sinking or surface disruption, such as picking or flaking off, etc., on the working surface thereof, (4) The matrix molding board has increased shelf life, thus eliminating the need for standing forms and the storage of various types of pattern plates; and (5) When a matrix is properly produced therefrom, the chances of having sinking or collapsed areas on the back surface thereof will be substantially reduced.

These and other objects and advantages of the present invention will be obvious to those skilled in the art from the following description and drawings wherein:

FIG. 1 and having a dull matte finish on the upper or/ platens of a press together with the other elements and the board to be acted upon in the method for practicing the present invention, with a part of one of the thin plates broken away to show the perforations therein.

Figure 1:
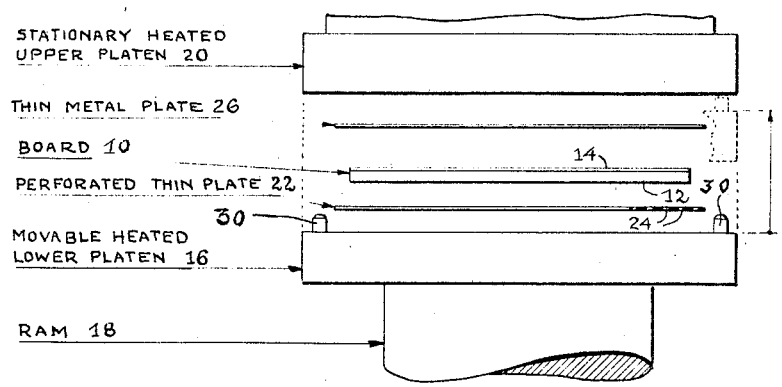
Figure 2:
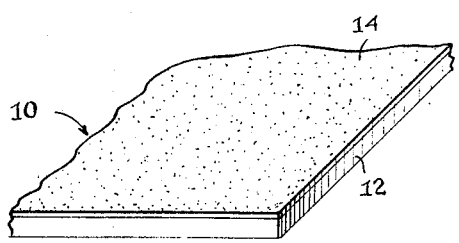
FIG. 2 is a fragmentary perspective view of a matrix molding board before being treated in the press shown in FIG. 1 and having a dull matte finish on the upper or working flat face thereof and with the lower face thereof being substantially flat throughout.

According to this invention, I employ a base in the form of a board or sheet of any desired length and width depending upon the equipment available for producing matrix molding board of the type shown in FIG. 2. The thickness of the base is in the range of about 0.1″ to 0.3″. The base is a self-supporting sheet or board consisting essentially of fibrous material together with a binder therefor. The binder is a resin in the intermediate state and is capable per se or in the presence of a catalyst and/or catalyst and aldehyde donor which is also preferably a component thereof of being heat converted to the solid infusible state. The base which is preferably employed in the practice of this invention is produced on a paper making machine of the wet type from a wet pulp composition produced in a heater and consisting essentially of fibers, phenolaldehyde resin of the type disclosed in said previously referred to U.S. patent and a catalyst and aldehyde donor together with a small and yet significant proportion of water. The water is present due to the fact that all of it had not been removed therefrom in the drying operation subsequent to the sheet formation on the paper making machine and/or due to absorption thereof from the atmosphere while in storage after said drying operation and completion of said sheet. The preferred base is characterized by having a comparatively low apparent or bulk density and is capable of being molded at comparatively low pressures and contains no greater than about 7% and generally about 5.5–7% by weight of volatiles, as determined by placing a 10-gram sample thereof in an oven maintained at 300° F. and permitting the same to remain therein for 30 minutes. (It is to be understood that when a percent volatile is herein set forth, it is measured and determined in that manner just previously described.) The base is further characterized by having flat upper and bottom faces. One face of said base is coated with a layer of molding material preferably consisting essentially of finely divided filler, such as wood floor and/or asbestos filler, together with resinous material in its intermediate state. The thickness of said layer is generally in the range of 0.030″–0.045″, generally using layers of the greater thickness on bases of greater thicknesses. The layer may be formed on the base by applying the material thereto in any of a number of different manner, and preferably by applying an alcohol slurry of said molding material to that surface of base to be coated thereby to provide said base with an even coating of said slurry of predetermined depth. The so-coated base is heated in an oven maintained at an elevated temperature of 140°–150° F. until the alcohol is all driven off and then the base having said dry layer thereon is removed from the oven. The layer measures about 0.03″ to 0.045″ in thickness and the outer working surface thereof is of a dull matte finish. The resultant moldable and thermosetting, board consisting of said base carrying said dull matte finish moldable and thermosetting coat, contains volatiles measuring at least 4% and generally 4–6% by weight thereof.

Said board which has been freshly made up or has been taken out of stock which had been stored for some time is conditioned thereby to reduce the volatiles content thereof to a value no greater than 3% and generally 2.5–3% by weight. To achieve that purpose without materially or significantly advancing the resin in either the base or said layer carried thereby the board is placed in an oven whose temperature is controlled and is at least 170° F. and no greater than the boiling point of water and is maintained therein until the volatiles by weight thereof measures no greater than 3% and no less than 2.5%, the time generally being 1–2 hours.

The so-conditioned board is now placed on a face of a flat thin metal vent plate which rests upon the lower heated platen of an hydraulic press, with the uncoated surface of the board being in contact with the upper face of the venting plate. The upper face of the vent plate has a plurality of narrow recesses therein, in the form of narrow perforations through the plate or narrow slots therein arranged parallel to each other or in criss-cross fashion or other desired design. Then a flat thin metal plate having a highly polished continuous flat working surface is placed on top of the dull matte surface of the board. Then the lower heated platen supporting said board between said plates is moved upwardly until the latter plate is in intimate contact with the working face of the stationary upper heated platen. The parts are permitted to remain in such condition, of very slight if any pressure applied to the board, for a short period generally from about 30–120 seconds whereby due to the heat transfer from the upper platen to said matte surface through the highly polished plate the matte surface becomes softened. Immediately thereafter and while still in said press, the lower platen is moved a predetermined distance upwardly towards the stationary platen thereby to subject the board to considerable pressure and heat, generally 250–400 pounds per square inch and 250°–280° F. This condition is maintained for a period of about 2–5 minutes and immediately thereafter the lower platen is retracted to open position together with the combination of plates 22 and 26 and the treated board therebetween and the temperature of said combination is reduced to room temperature by quick chilling in a cooling fixture or in any other convenient manner and the finished board is removed from between said plates.

In said period, due to the pressure and heat applied to the board whose dull matte finish was softened immediately prior to said application, the board was compressed to reduce the thickness thereof by about 15–25%, to reduce the percent volatiles by weight to a value no greater than 2% and generally in the range of 1.5–2% and to convert the dull matte finish into a smooth, shiny, glossy finish surface which upon cooling will not adhere to the highly polished plate and is free of pinholes or gasmarks. The resultant smooth, shiny, glossy finish surface free of pinholes, or gasmarks throughout the entire working surface area thereof is in part due to the escape of volatiles through the recesses in the vent plate. The bottom of the board is characterized by a large number of shallow projections or protuberances formed in the recesses of the vent plate in said period. Due to the short time that the outer working surface of the board was first subjected to heat while under very little if any pressure and then while under pressure for a short but longer time than the former operation, while the board is materially and significantly compressed and the outer working surface is converted into said smooth, shiny, glossy finish, the cure of the resins in the coating layer and the base thereof has not been substantially advanced so that the entire board is still moldable by conventional procedure for purposes intended. The shallow projections or protuberances are more easily compressible and therefore, when such a board is subjected to the conventional methods for producing a matrix therefrom, these protuberances or projections rest upon a supporting plate when the board is subjected to conventional heat and pressure. In general the projections or protuberances in those areas subjected to initial greater pressure tend to flatten out, thereby to reduce the liability of the finished matrix from having sink areas on the back of those portions thereof which were subjected to materially less initial pressure.

The following is a specific example of a novel board illustrative of one aspect of this invention and a novel method for producing said board, these being given by way of illustration and not limitation, all parts and percentages given herein being by weight unless otherwise specified.

A base 12 preferably employed in the practice of this invention measures about 0.1″–0.3″ in thickness and is flat on both the top and bottom surfaces thereof. In this example the base measured 20″ x 25″ x 0.180″. It consisted essentially of cellulose and asbestos fibers together with phenol-formaldehyde resinous material in its intermediate state and serves as a binder and hexamethylene tetramine which serves as an aldehyde catalyst donor for speeding the heat curing said resinous material to the thermoset state. The resin therein is phenol-formaldehyde and measures by weight about 33–45% and preferably 38–41% and the quantity of hexamethylene tetramine measures about 4–6% by weight of the base 12. The base 12 had a low apparent or bulk density measuring about 0.88–0.94, and a compression factor of about 43–48% at 1000 pounds per square inch. The volatile content of base 12 is in the range of about 5.5–7% and this particular instance is 5.8%. Said base 12 which is preferably employed in the practice of this invention is a readily available commercial product known on the market as "R–102" manufactured and sold by the Rogers Corporation of Rogers, Conn.

A face of the base 12 is coated with a layer of an alcohol slurry consisting of 60 parts of ethyl alcohol per 40 parts of molding material, which is a readily available commercial product, known as "Bakelite BMMA 5000" of Union Carbide Corporation. After the application of a uniform layer of said slurry thereto, the coated base 12 is placed and maintained about 140°–150° F. thereby to drive off the alcohol component resulting in the provision of a flat, dry, dull matte finish layer 14 firmly adhering to base 12. The thickness of the layer 14 in this particular case is 0.040″.

While the board 10 consisting of base 12 and layer 14 is useful as a matrix molding board, I prefer to treat it in the following manner to provide a further improved matrix molding board 10′. This particular board 10 has a volatile content of 4.22% and generally a higher volatile content value which is no greater than 6% after storage. The board 10 is placed in an oven at a temperature of preferably in the temperature range of 170°–

200° F. for a period of about 90 minutes whereby the volatile content is reduced in this instance to 2.9%. The so-conditioned board 10 is now laid flatwise on the upper flat surface of a thin perforated metal plate 22 which in turn lies flatwise upon the upper flat surface of a movable heated lower platen 16 which supports plate 22. The board 10 as placed on and supported by the perforated plate 22 has its entire bottom surface coextensive with the upper face of the plate 22. A thin flat unperforated and impervious metal plate 26 is placed upon and supported by the board 10, with the outer or upper surface of the layer 14 thereof being in contact throughout with and completely covered by the bottom highly polished smooth continuous flat surface of plate 26. By such an arrangement, there is provided a three layer "sandwich" supported by platen 16 which has a plurality of spaced steel thickness bearers 30 carried thereby. The plates 22 and 26 are composed of metal, such as aluminum or any other desired metal and in this embodiment measure in thickness no greater than 0.1" and in general 0.06"–0.1" for fast heat transfer. The number and size of the perforations 24 in plate 22 may vary and in the present embodiment, are in the range of 40–100 perforations per square inch substantially uniformly and evenly arranged, with each perforation measuring approximately one sixteenth to three thirty-seconds of an inch in diameter. It is to be understood, that the diameter of the perforations may be varied as may their number, but I prefer that the total area per square inch of the perforations be within the limits of those above set forth.

Figure 3:
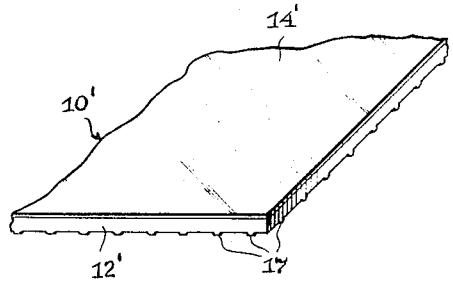
FIG. 3 is a view similar to FIG. 2 and shows the matrix molding board after being treated in the press shown in FIG. 1 and having a shiny and glossy pinhole free and gasmark free finish on the upper or working face thereof and the lower face thereof characterized by a large number of shallow teats, a preferred type of compressible projections.
Figure 4:
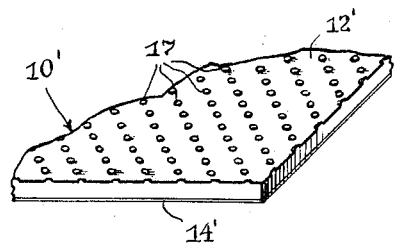
FIG. 4 is a bottom view of the fragment of matrix molding board shown in FIG. 3.
Figure 5:
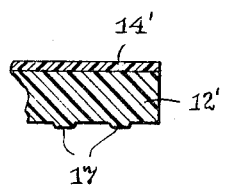
FIG. 5 is a vertical cross sectional view of a small portion of the matrix molding board shown in FIG. 3 and embodying an aspect of this invention.

Immediately after the "sandwich" effect is achieved, and with the heated platens 16 and 20 maintained at about 250°–275° F., the ram 18 is actuated to move platen 16 and the "sandwich" carried thereby upwardly until the upper surface of plate 26 is disposed throughout the entire area thereof firmly against the flat working face of the upper platen 20 whereupon the highly polished bottom surface of plate 26 firmly bears against the outer working surface of the layer 14 throughout the entire area thereof. In this condition, there is very little if any pressure, which in this embodiment preferably is in the range of zero to about 20 pounds per square inch exerted by the plate 26 against board 10. The aforesaid condition is maintained for a period of approximately 60 seconds thereby to soften the surface of layer 14 in contact with the plate 26. Immediately thereafter, the ram 18 is actuated to move it and the "sandwich" carried thereby upwardly until the preset bearers 30 strike against the platen 16 thereby limiting the degree of compression of the board 10. In this operation, the "sandwich" is subjected to pressure of 250–400 pounds per square inch. This is very quickly achieved in the matter of a few seconds. The board 10 is permitted to remain in said condition of pressure and heat from platens 16 and 20 maintained at 250°–275° F. for approximately 2 minutes. Immediately thereafter the pressure is released and platen 16 carrying the so treated "sandwich" is retracted from its upper position to its lower or open position. Then said "sandwich" which is hot is removed from hot platen 16 and transferred to a chilling fixture or press whereby the hot "sandwich" is quickly chilled to about room temperature. Then the operator removes the upper plate 26 from the board which I now designate as 10'. The board 10' as shown in FIG. 3 having a volatile content of 1.7% by weight and representing a specific aspect of this invention, is lifted off of the plate 22. The novel and improved board 10' is eminently suitable for the production of a molding matrix therefrom in the conventional manner without appreciable danger of blistering, "picking" and/or sinking; and said matrix is suitable for the production in the conventional manner of plastic printing plates therefrom. While maintained under said pressure and temperature conditions over said approximately 2 minute period: (1) the entire board 10 is compressed so that thickness of the resultant board 10' between the upper surface of plate 22 and the lower surface of plate 26 measures 0.185" and is reduced in this case about 20% thereby to provide a greater density layer 14' measuring 0.021" in thickness and a resultant greater density base 12'; (2) those portions of the original base 12 over the perforations 24 are squeezed .010", a short distance into the perforations 24 to provide a plurality of teats, knobs or bosses 17 which because they have not been materially compressed thicknesswise provide avenues of escape of the volatiles in the original board 10, with the volatiles escaping therefrom and through the perforations 24; (3) the previously softened entire continuous surface of the original continuous layer 14, which in its changed condition is designated as 14' is changed from a dull matte finish as shown in FIG. 2 to a smooth, shiny, glossy, finish, free of pinholes and gasmarks as shown in FIG. 3. The perforations or their equivalents in the plate 22 are essential to the production of such boards 10' free of pinholes and gasmarks and in addition to the provision of the teats or projections due to their being capable of being compressed at lower pressures than the rest of the board at the remaining areas thereof serve to provide a board 10' which is less liable to have sink areas when certain matrices are formed therefrom.

Instead of the protuberances or projections 17 being in the form of knobs, teats or bosses as shown in the drawings, they may be of various other shapes or forms and will function in the same manner as said knobs, teats or bosses and therefore are obvious equivalents thereof. For example, they may be in the form of short or elongated shallow projections or protuberances which may be arranged in any desired relationship to each other. By way of illustration and not limitation, they may be arranged in parallel relationship or in crisscross relationship whereby the projections are respectively in the form of shallow ribs in parallel relationship or in a cross-hatch type relationship. They obviously may be formed in the bottom of base 12 by providing the working face of the venting plate 22 with recesses in the form of narrow channels or slots rather than recesses in the form of the perforations 24, with the channels or slots arranged in the desired design. The width and depth of the channels or slots may vary, but I prefer that they be about one-sixteenth to three thirty-seconds of an inch in width and about 0.030" in depth, with or without the parts thereof of reduced thickness having perforations therethrough. When the board 10 is subjected to the high heat and pressure conditions during the compression step of the board 10, those portions of base 12 above the channels or slots extend into said channels or slots and terminate a considerable distance above the bottoms thereof so that the volatiles from said board are free to escape therethorugh. Like the knobs, teats or bosses 17, the area of all the projections or protuberances of whatever other design is preferably about 15–35% of the total area of the exposed face of compressed base 12'. Also, it is to be understood that the smooth flat surface of the plate 26 may be coated with a thin film of a releasing agent, such as any suitable liquid silicone or the like after each of said boards 10' is produced to assure no sticking and easy separation from smooth surface of element 26 of the next board 10' produced. It is further to be understood that in the present description and claims, the smooth face of the element 26 is regarded as being firmly in contact with the matte face of layer 14 in the softening thereof, regardless of whether or not the smooth face carries such a release film which in said softening may be located between said smooth face and said matte face.

While the novel matrix molding boards of this invention and the novel methods for producing them have been described in detail, they are not to be limited thereby because various changes and modifications may be made within the spirit and scope thereof without departing from the invention.

I claim:
1. A method for producing an improved matrix molding board comprising:

heating to 170°–212° F. a board having at least 4% by weight of volatiles and comprising a base 0.1–0.3″ thick and a matte face layer of thermosetting resinous molding material 0.030–0.045″ thick, said base comprising fibrous material and thermosetting resin, said resin measuring about 33–45% by weight of said base, said base having a compression factor of about 43–48% at 1,000 pounds per square inch, and an apparent density of 0.88–0.94, said heating continued for 1–2 hours until the volatiles content of said board is reduced to 2.5–3% without adversely affecting the moldability of said board, then sandwiching the board between a pair of platens and a pair of metal elements, one of said elements having a smooth continuous flat surface adjacent said matte face and the other element being perforated and adjacent to the other face of said board;

while being heated by one of said platens maintaining said smooth flat surface in contact with said matte face for 30–120 seconds to soften said face;

then while said surface is in said condition, and said platens are at elevated temperature of 250°–280° F. moving one of the platens with respect to the other a predetermined distance and then maintaining them in said relationship for a period to compress said board at 250–400 pounds per square inch, to reduce its thickness by approximately 15–25% and shallow sink knobs into said perforations and cause the escape of volatiles and said face is smooth and glossy without substantially advancing the cure of the resin in said layer and base so that the board is still moldable, then removing said sandwich from said platens and chilling same and removing the improved matrix molding board from said elements.

References Cited

UNITED STATES PATENTS

| | | | |
|---|---|---|---|
| 32,901 | 7/1861 | Simon | 264—134 |
| 589,470 | 9/1897 | Heath | 161—400 |
| 2,070,023 | 2/1937 | Olsen | 264—293 |
| 2,218,351 | 10/1940 | Crowell | 264—293 |
| 2,278,291 | 3/1942 | Swan | 117—11 |
| 2,452,821 | 11/1948 | Wood | 264—284 |
| 2,509,499 | 5/1950 | Higgins | 264—134 |
| 2,790,206 | 4/1957 | Cofek | 264—320 |
| 2,861,372 | 11/1958 | Hunt | 264—293 |
| 3,206,779 | 7/1966 | Tarbox | 264—293 |
| 2,345,629 | 4/1944 | Reilly | 18—56 |
| 2,578,209 | 12/1954 | Schwarz | 18—56 |
| 2,003,752 | 6/1935 | Landt | 161—205 |
| 2,930,727 | 3/1960 | Baranyi | 161—164 |

ROBERT F. WHITE, *Primary Examiner.*

RICHARD R. KUCIA, *Assistant Examiner.*

U.S. Cl. X.R.

264—320, 134, 219